United States Patent [19]
Kraz et al.

[11] Patent Number: 5,235,637
[45] Date of Patent: Aug. 10, 1993

[54] VOICE COMMUNICATION LINK INTERFACE

[75] Inventors: Vladimir Kraz, Santa Cruz; Paul Regen, Felton; Wayne Stade; Jeff Wimsatt, both of Aptos; Robert Young, Santa Cruz, all of Calif.

[73] Assignee: Plantronics, Inc., Santa Cruz, Calif.

[21] Appl. No.: 836,546

[22] Filed: Feb. 13, 1992

Related U.S. Application Data

[63] Continuation of Ser. No. 590,609, Sep. 25, 1990, abandoned, which is a continuation of Ser. No. 302,400, Jan. 26, 1989, abandoned.

[51] Int. Cl.⁵ ............................................. H04M 1/60
[52] U.S. Cl. ..................................... 379/387; 379/388; 379/389; 379/390; 379/416
[58] Field of Search ............... 379/387, 388, 389, 390, 379/395, 416, 421, 116; 381/106, 110, 46, 94

[56] References Cited

U.S. PATENT DOCUMENTS

| | | | |
|---|---|---|---|
| 3,784,749 | 1/1974 | Shigeyama et al. | 381/94 |
| 3,786,200 | 1/1974 | Camenzind | 381/112 |
| 4,536,888 | 8/1985 | Wilson | 381/106 |
| 4,696,032 | 9/1987 | Levy | 379/390 |
| 4,710,953 | 12/1987 | Lampl | 379/387 |
| 4,715,062 | 12/1987 | Korsky et al. | 379/388 |
| 4,750,207 | 6/1988 | Gebert et al. | 381/68.4 |
| 4,847,897 | 7/1989 | Means | 379/390 |
| 4,879,746 | 11/1989 | Young et al. | 379/399 |
| 4,891,837 | 1/1990 | Walker et al. | 379/390 |
| 4,908,855 | 3/1990 | Ohga et al. | 379/390 X |
| 5,070,527 | 12/1991 | Lynn | 379/388 X |

Primary Examiner—James L. Dwyer
Assistant Examiner—Magdy W. Shehata
Attorney, Agent, or Firm—Arnold, White & Durkee

[57] ABSTRACT

An apparatus 10 controls the two-way communication between the microphone 12 and speaker 36 of a telephone headset and a telephone base. A transmit channel 15 includes an expander 18 that controllably attenuates the transmitted communication signal when the user is not speaking into the microphone 12. Conversely, a receive channel 30 includes a compressor 34 that controllably attenuates the received communication signal to prevent over driving the speaker 36.

7 Claims, 4 Drawing Sheets

VOICE COMMUNICATION LINK INTERFACE

This application is a continuation of application Ser. No. 07/590,609, filed Sep. 25, 1990, which is a continuation of Ser. No. 302,400, filed Jun. 26, 1989, both now abandoned.

BACKGROUND OF THE INVENTION

1. Field of the Invention

The present invention relates to voice communication over a wired interconnection to a telephone base, and more particularly, to an apparatus for continuously controlling the expansion of an AC signal delivered from a microphone to a telephone base in response to detecting the presence of an audible voice signal presented to the microphone.

2. Description of the Related Art

In the field of telephone communications, background noise that is transmitted over the telephone line is, at best, annoying to the listener. Unfortunately, the frequency content of background noise is difficult to predict since it results from such a wide variety of sources.

Further, background noise is often within the upper frequency limits required for understanding human speech. Thus, even if the frequency spectrum of common sources of background noise could be identified and filtered, such filtering would reduce the quality of the transmitted voice signal. Accordingly, it is desirable to reduce the transmission of undesirable background noise without adversely affecting the quality of the transmitted voice signal.

The instant apparatus is directed to overcoming one or more of the problems set forth above.

SUMMARY OF THE INVENTION

The primary object of the present invention is to provide a voice expander that severely attenuates background noise when the user is not speaking, but passes the entire audible frequency range when the user is speaking.

To attain these and other objectives, an apparatus is provided for controlling an electrical communication signal delivered from a microphone to a telephone base. The apparatus includes means for detecting the presence of an electric representation of a voice signal encoded in the electrical communication signal and delivering a detection signal in response thereto. Further, means for expanding and attenuating the magnitude of the electrical communication signal in response to the presence and absence of the detection signal respectively is provided.

BRIEF DESCRIPTION OF THE DRAWINGS

Other objects and advantages of the invention will become apparent upon reading the following detailed description and upon reference to the drawings in which.

Figure 1:
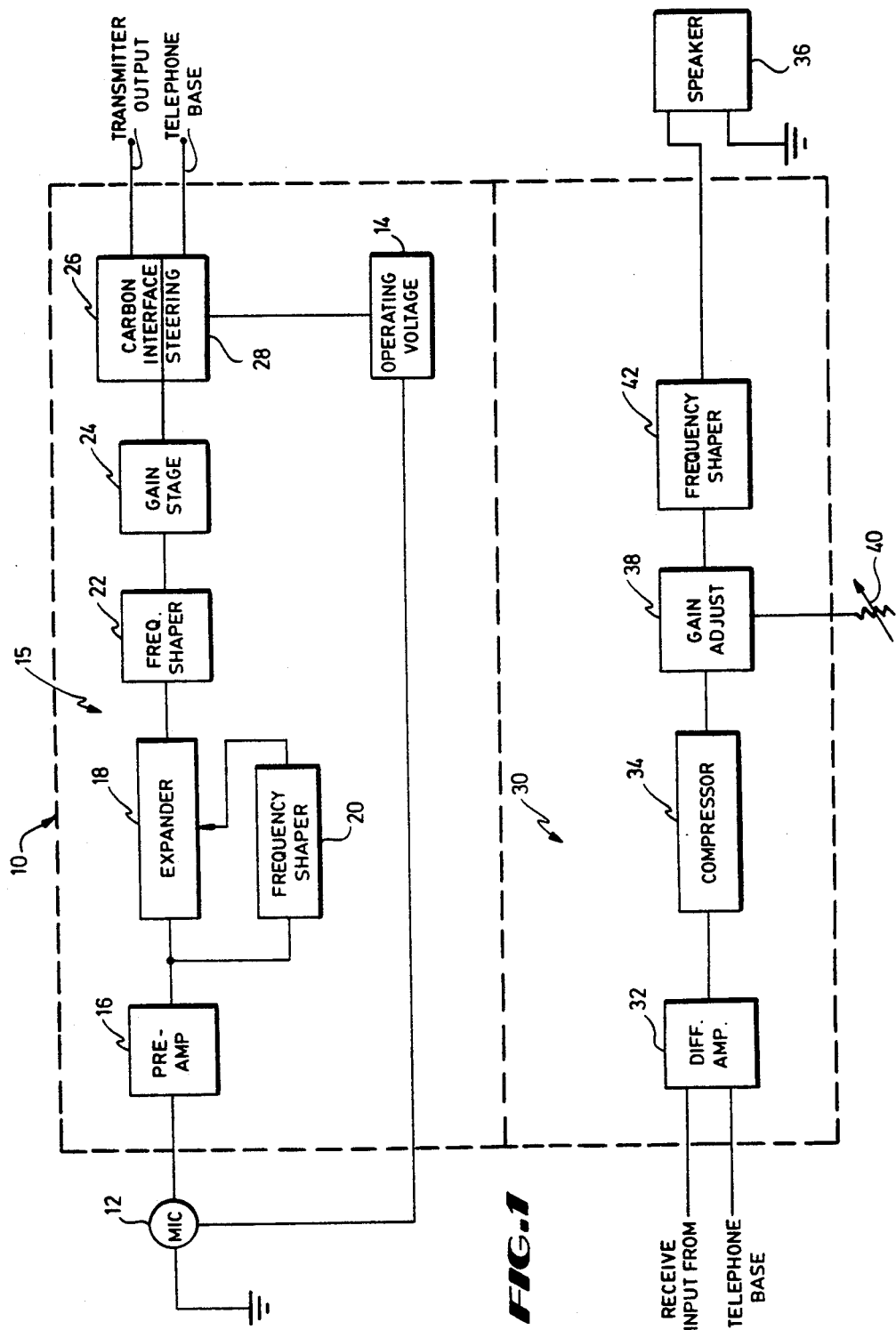
FIG. 1 is a block diagram of an embodiment of the instant apparatus.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the invention is intended to cover all modifications, equivalents, and alternatives falling within the spirit and scope of the invention as defined by the appended claims.

DESCRIPTION OF THE PREFERRED EMBODIMENTS

Turning now to the drawings and referring first to FIG. 1, a block diagram of the apparatus 10 is illustrated. A microphone 12, which can be, for example, the microphone section of a telephone headset, is shown connected to a source of operating voltage 14 and to electrical ground. The output of the microphone 12 is delivered to a transmit channel 15, which interfaces the headset microphone 12 and the telephone base. The transmit channel 15 includes a pre-amplifier 16, which operates to produce a preselected voltage corresponding to a preselected acoustic level, independent of the type of microphone used. The output of the pre-amplifier 16 is delivered to the inputs of both an expander 18 and a frequency shaper 20. The frequency shaper 20 is preferably a band pass filter constructed to pass signals within the range of 200 to 800 Hz and severely attenuate any electrical signals outside of this range.

The expander 18 provides approximately 13 dB of attenuation when the output of the pre-amplifier 16 is sufficiently low. The controlling input to the expander 18 is provided by the pre-amplifier 16 through a band-pass filter. It is the output of the band-pass filter that determines the amount of expansion that will be achieved by the expander 18. The frequency response of the signal being attenuated by the expander 18 is unaffected by operation of the expander 18, only the magnitude of the signal is affected.

The overall operation of the expander 18 and frequency shaper 20 is intended to attenuate the signal when a voice signal is not present at the microphone 12, but to pass the signal when a voice signal is present at the microphone 12. In this manner, undesirable background noise is significantly reduced when the user is not speaking.

The output of the expander 18 is delivered to a second frequency shaper 22 that operates to increase the gain of the electrical signal corresponding to increasing frequency, up to a 3 kHz peak. Accordingly, the frequency shaper 22 takes the form of a high Q second-order low-pass filter with a peak at approximately 3 kHz.

Thereafter, the output of the frequency shaper 22 is delivered to a gain stage 24, which amplifies the output of the frequency shaper 22 by a preselected amount determined by component selection.

With the signal properly amplified to the desired transmission levels, the output of the gain stage 24 is passed through a carbon interface 26. The carbon interface 26 allows the apparatus 10 to be connected to a telephone base that employs older carbon technology. Further, the carbon interface 26 also includes a current steering circuit 28 that draws power from the telephone base in order for the apparatus 10 to operate independent of a separate voltage source, such as a battery. The current steering circuit 28 is connected to the source of operating voltage 14 whereby power is delivered to the apparatus 10 from the telephone base.

Similarly, the apparatus 10 includes a receive channel 30 connected to a pair of output lines from the telephone base. This pair of receive channel input lines is connected to a differential amplifier 32 in order to provide common mode rejection to reduce undesirable noise present on these lines. The output of the differential amplifier 32 is connected to the input of a compressor 34.

The compressor 34 is an automatic gain control (AGC) that operates to prevent excessive electrical signals from being passed to the speaker 36 of the telephone headset. Obviously, undesirably high electrical input signals will produce painfully loud audible signals at the speaker 36. These audible signals can easily exceed the comfort level of the user. The AGC of the compressor 34 preferably operates to produce at least a 40 dB compression range of the received electrical signal, thereby limiting the audible level at the speaker 36 without producing undesirable distortion of the received electrical signal. The output of the compressor 34 is delivered to a gain adjuster 38, which includes an adjustable potentiometer 40 that is accessible to the user. Accordingly, the user adjusts the overall gain of the receive channel 30 to match his/her individual characteristics. For example, an individual whose hearing has deteriorated may easily adjust the overall volume of the received signal by manipulating the potentiometer 40.

The output of the gain adjuster 38 is connected to the input of a frequency shaper 42 so that the electrical signal delivered to the speaker 36 is frequency shaped to match the characteristics of the particular device being used. For example, headsets of different design have different operating characteristics that perform well at different ranges of electrical input signals. In particular, some headsets operate better when the low frequency content of the electrical signal is amplified. Accordingly, in some applications the frequency shaper is configured as of a low-pass filter.

Figure 2:
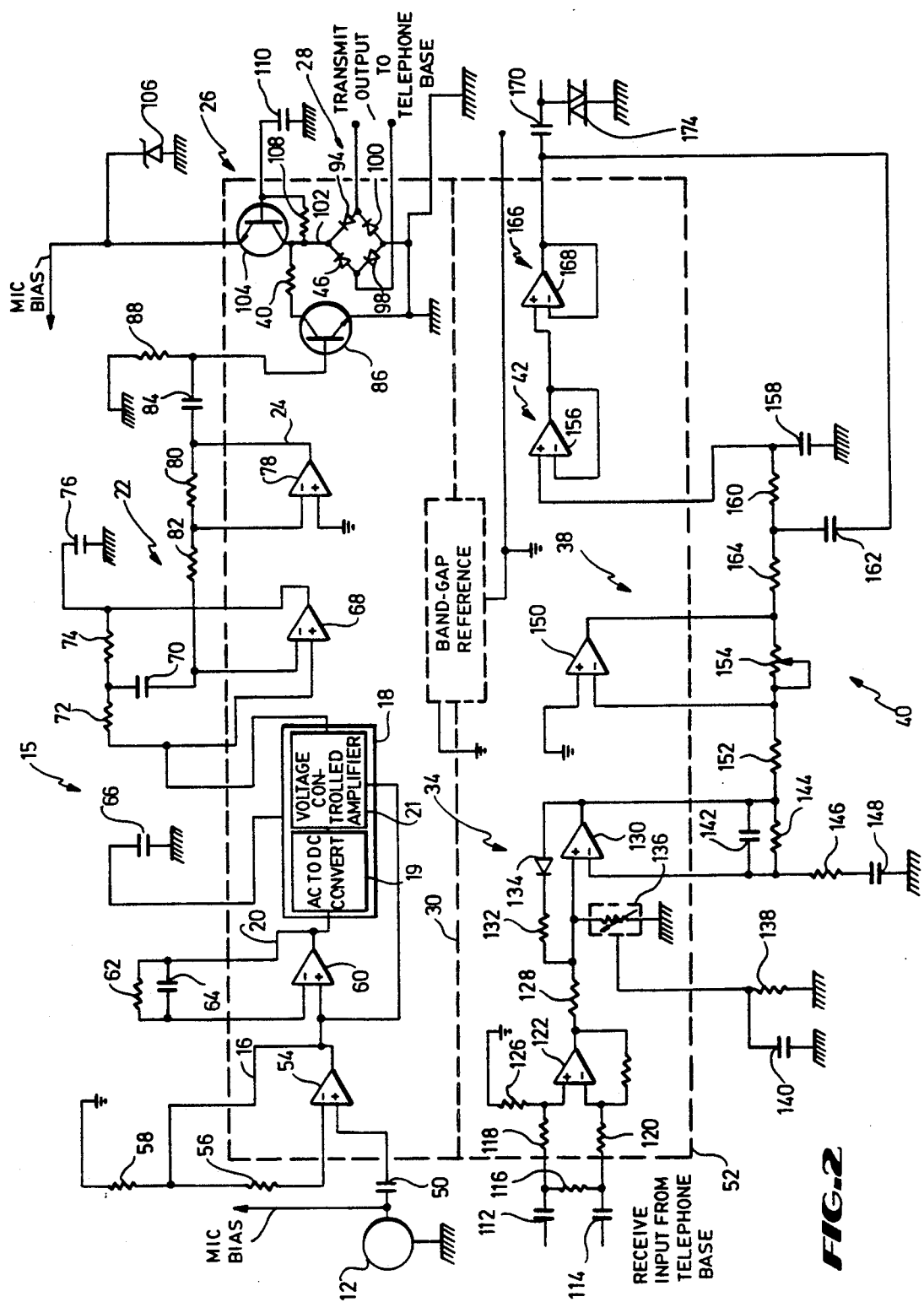
FIG. 2 is an electrical schematic of an embodiment of the instant apparatus.

Referring now to FIG. 2, a more detail electrical schematic of the block diagram illustrated in FIG. 1 is shown. The microphone 12 is connected through a coupling capacitor 50 to an input port of an integrated circuit (IC) generally indicated by the dashed line 52. All of the active components of the apparatus 10 are shown contained within the IC 52 whereas generally all of the resistor and capacitor connections are made external to the IC 52.

The output of the microphone 12 is connected to the pre-amplifier 16, which includes an operational amplifier 54 having its non-inverting input connected to the microphone output and its inverting input connected through a pair of series resistors 56, 58 to analog ground. Further, the output of the operational amplifier 54 is also connected to the junction of the series resistors 56, 58. Therefor, the ohmic ratio of the resistors 56, 58 determines the gain of the pre-amplifier 16. The values of these resistors are selected to produce an electrical output, such that the voltage level of the output corresponds to a preselected voltage level for a preselected auditory level presented at the microphone 12.

The frequency shaper 20, is illustrated having an operational amplifier 60 with a parallel combination of a resistor 62 and a capacitor 64 connected in a feedback loop between its output and its inverting input. Further, the output of the pre-amplifier 16 is connected to the non-inverting input of the operational amplifier 60. Accordingly, the frequency shaper 20 is configured to operate as a band-pass filter. The ohmic and capacitive values of the resistor 62 and capacitor 64 determine the upper and lower limits of the band-pass filter. Preferably, the values selected for resistor 62 and capacitor 64 allow signals in the 200-800 Hz range to pass therethrough. Auditory signals within this range correspond to the voice spectrum of a typical user. Therefor, the presence of an electrical signal in this frequency range is an indication that the user is speaking into the microphone 12. Accordingly, the band-pass filter operates as a means for detecting the presence of a voice signal. The output of the operational amplifier 60 is also connected to an input of the expander 18.

Thus, when an auditory signal in the range of 200 to 800 Hz is presented to the microphone 12, an electrical signal of that same frequency is passed through the pre-amplifier 16 and frequency shaper 20 to the expander 18. Further, the output of the pre-amplifier 16 is also delivered directly to the expander 18, bypassing the frequency shaper 20. Operation of the expander 18 is discussed in greater detail in conjunction with the detailed block diagram of FIG. 3. At this time it is sufficient to understand that the expander 18 passes the output of the pre-amplifier 16 when the output of the frequency shaper 20 indicates that the auditory signal is within the 200 to 800 Hz range. Further, the expander 18 severely attenuates the passed signal when no signal in the desired range is present, but continuously, variably attenuates the passed signal relative to the magnitude of signals in the desired range. Moreover, the expander 18 operates to continuously adjust the magnitude of the output of the pre-amplifier 16 so as to produce an auditory signal that is readily hearable when the user is speaking, but does not transmit background noise when the user has stopped speaking. The rate that the expander 18 adjusts the pre-amplifier signal is controlled by a capacitor 66 connected through an input port of the IC 52 to the expander 18.

The expander 18 includes an AC to DC converter 19 for detecting the magnitude of signals in the 200 to 800 $H_3$ range. A voltage controlled amplifier 21 is controlled by the output of the AC to DC converter 19 so as to attenuate the passed signal in the absence of a voice signal or in the presence of low level voice signals.

In order to compensate for high frequency losses caused by telephone transmission lines, the frequency shaper 22 provides an increasing gain for increasing signal frequency, up to 3 kHz. This frequency dependent gain is accomplished by a low-pass filter having a peak at 3 kHz. The frequency shaper 22 includes an operational amplifier 68 having a non-inverting input connected to the output of the expander 18. The inverting input of the operational amplifier 68 is also connected to the output of the expander 18, but through a series connected capacitor 70 and resistor 72. The junction of the resistor 72 and capacitor 70 is also connected to system ground through a series connected resistor 74 and capacitor 76. Of course, the values of the resistors and capacitors 70, 72, 74, 76 determine the characteristics of the low-pass filter. Preferably, the low-pass filter has an increasing gain of 40 db/dec up to 3 kHz and a decreasing gain at a much greater rate above 3 kHz.

The gain stage 24 includes an operational amplifier 78 with a feedback resistor 80 connected between the output and inverting input of the operational amplifier 78.

A series resistor 82 interconnects the output of the frequency shaper 22 and the inverting input of the operational amplifier 78. The non-inverting input of the operational amplifier 78 is connected to analog ground. Thus, it can be seen that the omhic ratio of the resistors 80, 82 controls the gain of the gain stage 24.

A coupling capacitor 84 connects the output of the gain stage 78 to the carbon interface 26. The carbon interface 26 includes a PNP type bipolar junction transistor having its base connected to the coupling capacitor 84 and to system ground through a resistor 88. The collector of the transistor 86 is connected to system ground while the emitter is connected through a resistor to the current steering circuit 28.

The current steering circuit 28 includes a series of four diodes connected to a pair of lines that extend to the telephone base. These telephone base lines carry a DC voltage which is of unknown polarity. Therefore, in order for the apparatus 10 to draw power from the telephone base lines, the current steering circuit 28 must properly determine the polarity of the telephone base lines and deliver the power to the apparatus 10. The four diodes 94, 96, 98, 100 act to deliver positive voltage over the line 102 to the collector of an NPN bipolar junction transistor 104. The emitter of transistor 104 is connected to the cathode of a zener diode 106. Zener diode 106 operates to clamp the DC telephone base voltage to the desired operating voltage of the apparatus 10. Preferably, the operating voltage of the apparatus 10 is approximately 3.9 volts. A resistor 108 is connected between the base and collector of the transistor 104 and a capacitor 110 interconnects the base of the transistor 104 to system ground.

Accordingly, it can be seen that the transistor 104 operates to filter AC signals from the operating voltage by acting as a high impedance circuit to AC signals while allowing DC signals to pass therethrough. On the other hand, the transistor 86 superimposes an AC voltage onto the telephone base line. This AC voltage signal has a frequency and amplitude corresponding to the auditory signals delivered to the microphone 12. Thus, the carbon interface 26 acts to encode an AC voltage signal onto the DC offset of the telephone base lines and thereby communicate the original auditory signal to the telephone base.

The receive channel 30 is connected to a pair of receive input lines from the telephone base. A pair of coupling capacitors 112, 114 are serially connected in the telephone base input lines while a resistor 116 is shown serially interconnecting the two lines. These two telephone base input lines are connected to a pair of input ports on the IC 52 and through a pair of current limiting resistors 118, 120 respectively to the differential amplifier 32.

The differential amplifier 32 includes a pair of current limiting resistors 118, 120 respectively connected to the receive input lines and to the non-inverting and inverting inputs of an operational amplifier 122. A feedback resistor 124 interconnects the output of the operational amplifier 122 and its inverting input. The non-inverting input of the operational amplifier 122 is also connected to analog ground through a series resistor 126.

A series resistor 128 interconnects the differential amplifier 32 and the compressor 34. The compressor 34 includes an operational amplifier 130 having its non-inverting input connected to the resistor 128 while a feedback resistor 132 and series connected diode 134 connect the output and the non-inverting input of the operational amplifier 130. An electrically variable resistor 136 is also connected to the non-inverting input of the operational amplifier 130 and to system ground. The omhic value of the variable resistor 136 is controlled by the voltage level present on the non-inverting input of the operational amplifier 130. Further, a parallel combination of a resistor 138 and capacitor 140 control the rate at which the electrically adjustable resistor 136 is varied. The resistor 138 and capacitor 140 are connected in parallel to the non-inverting input of the operational amplifier 130. Accordingly, it can be seen that the voltage drop across electrically variable resistor 136 controls the voltage level presented to the non-inverting input of the operational amplifier 130.

A combination of resistors and capacitors 142, 144, 146, 148 interact with the operational amplifier 130 to compress the magnitude of the electrical signal received from the differential amplifier 32. Preferably, this compression is at least 40 dB, which is determined by the values selected for the capacitors and resistors 142, 144, 146, 148.

Operational amplifier 130 in conjunction with components 142, 144, 146, 148 form a signal amplifier. The diode 134 converts this signal to a DC current that charges capacitor 140 through resistor 132. This DC voltage controls a voltage controlled attenuator 128, 136 to reduce the signal level at the non-inverting terminal of operation amplifier 130 to a fixed level. The timing of this attenuation action is an important aspect of the process, and is set to provide a very broad dynamic range for speech. This is accomplished by providing a very long time constant for compression "attack" and a very short time for compression "release." Attack time is set to approximately 1.5 seconds and is defined as the time it takes for the attenuation ratio to settle to within 90% of its final value. The attenuation process follows an exponential curve with a time constant of approximately 250 ms. The release time is fixed at approximately 50 ms.

The gain of operational amplifier 130 is set such that steady state input signals greater than approximately −50 dBV at the receiver input will be attenuated after the required attack time conditions are met.

The output of the compressor 34 is connected to a manually adjustable gain stage 38. The gain stage 38 includes an operational amplifier 150 having its non-inverting input connected to analog ground and its inverting input connected to compressor 34 through a series resistor 152. Further, the output of the operational amplifier 152 is connected to its own inverting input via a feedback variable resistor 154. The variable resistor 154 is accessible by the user of the telephone so as to control the gain applied by the gain adjust stage 38. It should be recognized that the ratio of the resistor 152 and variable resistor 154 determines the gain applied by the gain adjust stage 38.

The output of the gain adjust stage 38 is delivered to a frequency shaper 42, which modifies the electrical signal according to the type of equipment associated with the apparatus 10. For example, some headphone sets operate best when the lower frequency signals are enhanced. Accordingly, in this embodiment the frequency shaper 42 is preferably a low-pass filter that includes an operational amplifier 156 having its inverting input connected to its own output. The non-inverting input of the operational amplifier 156 is connected through a resistor capacitor network 158, 160, 162, 164 configured as a low-pass filter.

Finally, a buffer driver 166 is connected to the output of the frequency shaper 42 so that the apparatus 10 is configured as a low impedance output device which has a value of preferably 30 ohms. A coupling capacitor 170 connects the output of the buffer driver 166 to the headset speaker 172. The electrical signals received from the telephone base are delivered to the microphone 172 and the original auditory signal is reproduced at a desirable comfort level. A pair of zener diodes 174 are connected to the junction of the coupling capacitor 170 and speaker 172 and to system ground so as to clip any inadvertently high signals that are allowed to pass through the receive channel 30. Each of the diodes 174 is reversed biased so as to clamp excessively high negative or positive signals at a preselected maximum value.

Figure 3:
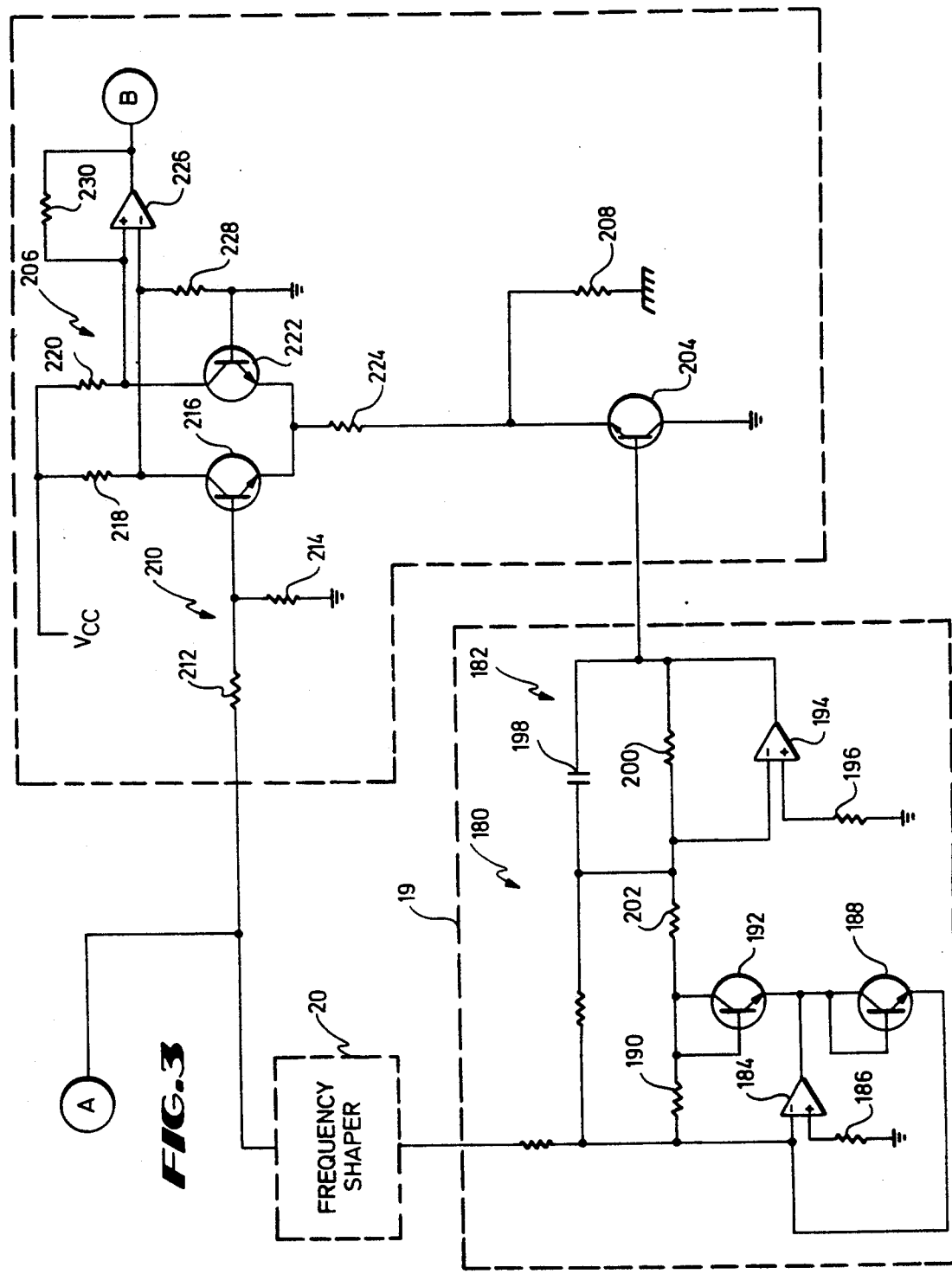
FIG. 3 is an electrical schematic of the expander section of an embodiment of the instant apparatus.

Referring now to FIG. 3, an electrical schematic of one embodiment of the expander 18 is illustrated. It should be noted that the schematic illustrated herein is intended to describe one embodiment of the expander 18, however, numerous variation are envisioned that do not depart from the spirit and scope of the instant invention.

The precision AC to DC converter 19 and voltage controlled amplifier 21 are shown contained within dashed lines 19, 21. The overall object of the expander 18 is to control the amplification of the electrical signal delivered by the frequency shaper 20 to pass the auditory signal detected by the microphone 12 when the user is speaking and to block background noise signals detected by the microphone 12 when the user is not speaking.

The AC to DC converter 19 receives an input from the shaper 20, which is an AC signal having a variable magnitude and frequency dependent upon the auditory signal presented to the microphone 12. Of course, the frequency shaper 20 insures that only AC signals within the 200 to 800 Hz range are delivered to the AC to DC converter 19. In this manner, the gain of the voltage controlled amplifier 21 is controllably increased only when the user is talking into the microphone. Thus, useless background noise is attenuated when the user is not speaking into the microphone 12.

The AC to DC converter 19 includes a rectifier circuit 180 and an integrator 182. The rectifier 180 includes an operational amplifier 184 having a non-inverting input connected to analog ground through a resistor 186 and an inverting input connected to its own output through a PNP bipolar junction transistor 188 and through a series combination of a resistor 190 and NPN bipolar junction transistor 192. The integrator 182 includes an operational amplifier 194 having a non-inverting input connected to analog ground through a resistor 196 and inverting input connected to its own output via a parallel combination of a feedback capacitor 198 and resistor 200. The rectifier 180 is connected to the integrator 182 via a resistor 202.

The output of the integrator 182 is a DC voltage signal having a magnitude corresponding to the average magnitude of the AC input signal, but independent of the frequency of the AC input signal. The integrator output is connected to the base of a PNP type bipolar junction transistor 204 where the collector of the transistor 204 is connected to analog ground and the emitter is connected to a differential amplifier circuit 206 and to system ground through a resistor 208.

The differential amplifier circuit 206 receives an input signal from pre-amplifier 16. A voltage divider 210 consisting of a pair of resistors 212, 214 receives the input signal and delivers that signal to the base of an NPN type bipolar junction transistor 216. A resistor 218 is connected in series between the collector and emitter of the transistor 216 and system voltage ($V_{cc}$). A series connected resistor 210 and NPN type bipolar junction transistor 222 are connected in parallel with the resistor 218 and transistor 216 with the emitters of the transistors 216, 222 connected through a resistor 224 to the emitter of transistor 204. An operational amplifier 226 has its inverting and non-inverting inputs respectively connected to the junctions of the resistor 218 and transistor 216 and resistor 220 and transistor 222 respectively. Additionally, a resistor 228 connects the non-inverting input of the operational amplifier 226 to analog ground and a feedback resistor 230 interconnects the non-inverting input and output of the operational amplifier 226. The output of the operational amplifier 226 corresponds to the output of the expander 18.

Accordingly, it can be seen that as the DC voltage delivered by the AC and DC converter varies, the gain of the voltage controlled amplifier correspondingly varies. For example, when a user is not speaking into the microphone 12 and no signals in the 200-800 Hz range are present, a low level DC signal is presented to the base of transistor 204. This low level signal reduces the gain of the voltage controlled amplifier 21 to a large degree, severely attenuating signals delivered by the pre-amplifier 16. Correspondingly, when the user begins speaking into the phone such that electrical signals in the 200-800 Hz range are present, the AC to DC converter 19 produces a high level DC signal at the base of transistor 204, increasing the gain of the voltage controlled amplifier 21 towards unity. Thus, the signal delivered by the pre-amplifier is attenuated less severely or not at all.

Figure 4:
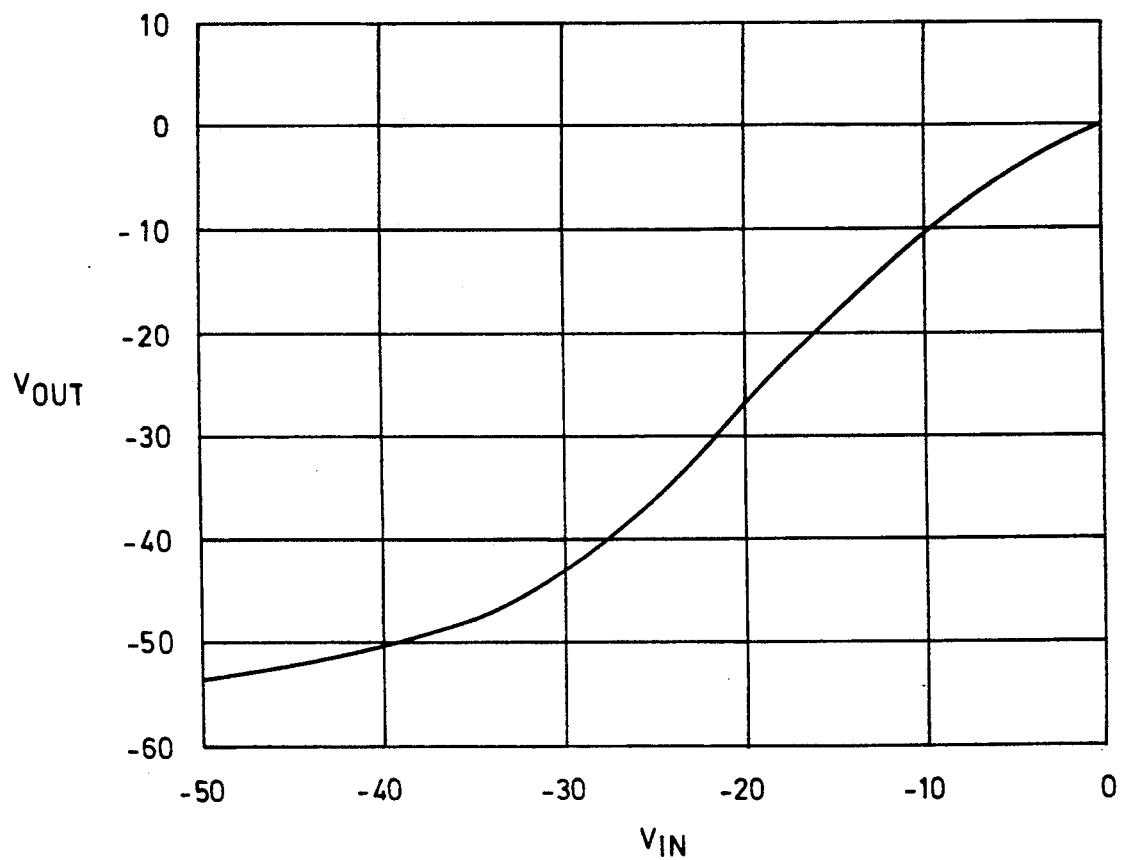
FIG. 4 is a graphical representation of input voltage versus output voltage for the expander section of the instant apparatus.

In the preferred embodiment the gain of the voltage controlled amplifier 21 takes the form schematically shown in FIG. 4. In the zero to minus 10 dB range the gain of the voltage controlled amplifier 21 is generally linear. However, from minus 10 dB to minus 30 dB the attenuation is more severe, resulting in greater relative attenuation for low level input signals. Below this level the attenuation is reduced, however, the level of attenuation is insignificant since the signals are already at such a low level.

We claim:

1. An apparatus for controlling an electrical communication signal delivered from a microphone to a telephone base, comprising:
    a band-pass filter adapted to receive said electrical communication signal and deliver a selected portion of said electrical communication signal in response to said electrical communication signal being within a preselected frequency range corresponding to a frequency range of a human voice;
    means for receiving said selected portion of said electrical communication signal and delivering a detection signal in response thereto, said detection signal having a magnitude corresponding to the magnitude of said selected portion of said electrical communication signal; and
    means for continuously expanding the magnitude of said electrical communication signal by attenuating the magnitude of said electrical communication signal by a factor correlative to the magnitude of said detection signal in response to the magnitude of said detection signal being less than a preselected level.

2. An apparatus, as set forth in claim 1, wherein the detection means includes an AC to DC converter adapted for receiving said selected portion of said electrical communication signal and delivering said detection signal.

3. An apparatus, as set forth in claim 2, wherein said expanding means includes a voltage controlled amplifier adapted for receiving and attenuating said electrical communication signal and having a control input adapted for receiving said detection signal, whereby said electrical communication signal is continuously attenuated by a factor directly corresponding to the magnitude of said detection signal in response to said detection signal being less than a preselected level.

4. An apparatus for controlling an electrical communication signal delivered from a microphone to a telephone base, comprising:

means for detecting the presence and magnitude of an electric representation of a voice signal encoded in said electrical communication signal and delivering a detection signal in response thereto, said detection signal having a magnitude corresponding to the magnitude of said electric representation of said voice signal;

means for continuously expanding the magnitude of said electrical communication signal by attenuating the magnitude of said electrical communication signal by a factor correlative to the magnitude of said detection signal in response to the magnitude of said detection signal being less than a preselected level; and a frequency shaper adapted for receiving the expanded electrical communication signal from said expanding means and continuously amplifying said expanded electrical communication signal by a factor directly corresponding to the frequency of said expanded electrical communication signal.

5. An apparatus, as set forth in claim 4, wherein said frequency shaper includes a low-pass filter adapted to receive said expanded electrical communication signal.

6. An apparatus, as set forth in claim 4, wherein said frequency shaper is adapted for receiving the expanded electrical communication signal from said expanding means and continuously amplifying said expanded electrical communication signal by a factor directly corresponding to the frequency of said expanded electrical communication signal below a preselected frequency and by a factor inversely corresponding to the frequency of said expanded electrical communication signal above a preselected frequency.

7. An apparatus, as set forth in claim 6, wherein said frequency shaper includes a low-pass filter adapted to receive said expanded electrical communication signal.

* * * * *